(12) United States Patent
Funabashi et al.

(10) Patent No.: US 7,932,697 B2
(45) Date of Patent: Apr. 26, 2011

(54) POWER TOOL

(75) Inventors: Kazuhiko Funabashi, Hitachinaka (JP);
Shinji Watanabe, Hitachinaka (JP); Eiji Nakayama, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/910,291

(22) Filed: Oct. 22, 2010

(65) Prior Publication Data

US 2011/0037435 A1 Feb. 17, 2011

Related U.S. Application Data

(62) Division of application No. 11/850,884, filed on Sep. 6, 2007.

(30) Foreign Application Priority Data

Sep. 7, 2006 (JP) ................................ P2006-243168

(51) Int. Cl.
*H02J 7/00* (2006.01)
(52) U.S. Cl. .................... 320/114; 320/136; 320/163
(58) Field of Classification Search .................. 320/112, 320/114, 136, 163
See application file for complete search history.

(56) References Cited

U.S. PATENT DOCUMENTS

| | | | |
|---|---|---|---|
| 5,406,130 A | 4/1995 | Hennig | |
| 5,783,998 A | 7/1998 | Nakajou et al. | |
| 5,789,900 A | 8/1998 | Hasegawa et al. | |
| 5,896,025 A | 4/1999 | Yamaguchi et al. | |
| 5,929,600 A | 7/1999 | Hasegawa | |
| 6,227,774 B1 | 5/2001 | Haughton et al. | |
| 6,331,764 B1 | 12/2001 | Oglesbee et al. | |
| 6,388,426 B1 | 5/2002 | Yokoo et al. | |
| 6,729,414 B2 | 5/2004 | Cooper et al. | |
| 7,077,179 B1 | 7/2006 | Camiano et al. | |
| 7,157,882 B2 | 1/2007 | Johnson et al. | |
| 7,521,892 B2 | 4/2009 | Funabashi et al. | |
| 2002/0039671 A1 | 4/2002 | Yanagisawa | |
| 2003/0096158 A1 | 5/2003 | Takano et al. | |
| 2004/0263119 A1 | 12/2004 | Meyer et al. | |

(Continued)

FOREIGN PATENT DOCUMENTS

CN 1338054 A 2/2002

(Continued)

OTHER PUBLICATIONS

European Search Report issued in European Patent Application No. EP 07 01 7595.5 dated Dec. 10, 2009.

(Continued)

*Primary Examiner* — Edward Tso
*Assistant Examiner* — Aaron Piggush
(74) *Attorney, Agent, or Firm* — McDermott Will & Emery LLP

(57) ABSTRACT

A power tool 1 is connected to a battery pack 5 including an overcurrent detector 533 which detects overcurrent of a battery module 51 and outputs a detection signal, and an overdischarge detector 532 which detects overdischarge of the battery module 51 and outputs a detection signal. The power tool 1 includes a motor 2 which is driven by electric power supplied from the battery pack 5, a trigger switch 31 for setting the power supply from the battery pack 5 to the motor 2 in ON/OFF state, and an FET 410 which sets the power supply to the motor 2 in ON/OFF state on the basis of the detection signal from the overcurrent detector 533 or the overdischarge detector 532.

5 Claims, 3 Drawing Sheets

U.S. PATENT DOCUMENTS

| | | |
|---|---|---|
| 2005/0077878 A1 | 4/2005 | Carrier et al. |
| 2006/0087285 A1 | 4/2006 | Phillips et al. |

FOREIGN PATENT DOCUMENTS

| | | |
|---|---|---|
| EP | 1 646 103 A | 4/2006 |
| EP | 1 667 306 A | 6/2006 |
| JP | 4-317526 | 11/1992 |
| JP | 05-146387 | 6/1993 |
| JP | 6141479 A | 5/1994 |
| JP | 06-284554 | 10/1994 |
| JP | 06-296568 | 10/1994 |
| JP | 7-312825 | 11/1995 |
| JP | 9-180690 | 7/1997 |
| JP | 9-233875 | 9/1997 |
| JP | 2001-128377 | 5/2001 |
| JP | 3222951 B2 | 8/2001 |
| JP | 2004-032997 | 1/2004 |
| JP | 2005-131770 | 5/2005 |
| JP | 2006-192518 | 7/2006 |
| WO | WO 96/24170 | 8/1996 |
| WO | WO 01/22107 A1 | 3/2001 |

OTHER PUBLICATIONS

United States Office Action, issued in U.S. Appl. No. 11/850,884, mailed on Sep. 14, 2010.

United States Office Action issued in U.S. Appl. No. 12/880,258 dated Nov. 26, 2010.

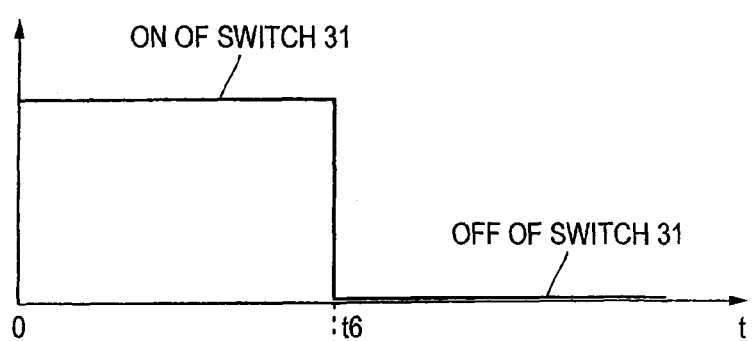
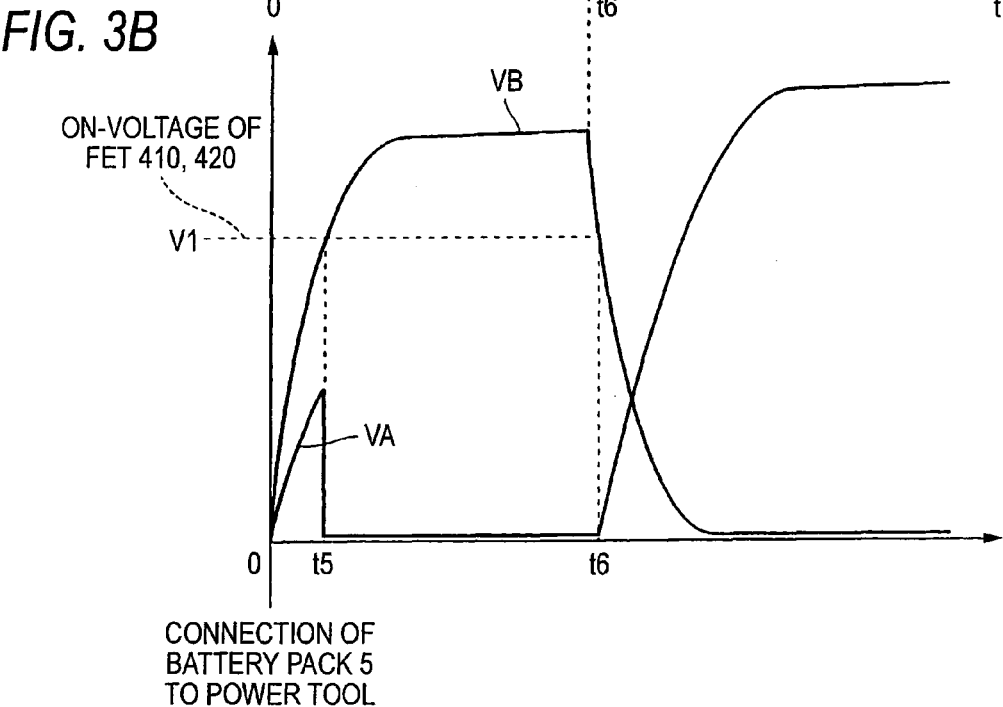

POWER TOOL

CROSS-REFERENCE TO RELATED APPLICATIONS

This application is a Divisional application of U.S. patent application Ser. No. 11/850,884, filed on Sep. 6, 2007, based on and claims the benefit of priority from the prior Japanese Patent Application No. 2006-243168, filed on Sep. 7, 2006; the entire contents of which are incorporated herein by reference.

TECHNICAL FIELD

The present invention relates to a power tool, and particularly to a power tool which prevents overcurrent and overdischarge of a battery pack.

BACKGROUND

Description of the Related Art

Heretofore, there has been known a codeless power tool (hereinafter referred to as a power tool) such as a driver or a circular saw which can operate by supply of electric power from a battery pack. Large electric power is necessary to operate such the power tool. Therefore, recently, in addition to a nickel-cadmium battery and a nickel-hydride battery, a lithium-ion battery is used widely as a charging battery of the battery pack.

The lithium-ion battery has an advantage that large electric power can be supplied and size/weight reduction of a tool can be realized. On the other, the lithium-ion battery must strictly cope with the ignition of the battery and the life lowering thereof due to overcharge, overcurrent and overdischarge. For example, in the lithium-ion battery, it is thought that: when the overdischarge is produced or the over current flows in a load, a battery temperature increases thereby to cause lowering of the battery life or to cause breakdown of a motor of a power tool; or when overcharge is produced, the ignition of the battery is produced. For the above problems, there has been known a battery pack which includes a braking unit that interrupts supply of the electric power to the power tool (for example, refer to Japanese Patent No. 3,222,951). Japanese Patent No. 3,222,951 discloses FET (Field-Effect Transistor) as a breaking unit.

SUMMARY

There is a battery pack in which plural FET's are provided as a braking unit in order to prevent the overcurrent and the overdischarge. Herein, also in case that the current larger than permissible maximum current of the FET flows in the power tool, the power supply to the power tool can be surely interrupted by the plural FET's. Further, there is also a battery pack which is not used exclusively for a specified power tool but can be used for various kinds of power tools in common. Therefore, depending on the used power tool, the number of the FET's included in the battery pack cannot make the interruption of the overcurrent possible. Namely, in case that the number of the FET's included in the battery pack is small, and the current flowing in the power tool connected to the battery pack is large, the current flows in the FET's excessively, and the FET's break down. To the contrary, in case that the number of the FET's included in the battery pack is large, and the current flowing in the power tool connected to the battery pack is small, the FET's become useless.

Therefore, the invention has an object to provide a power tool which includes the necessary number of braking units which interrupts the flow of the current when the overcurrent or the overdischarge is produced.

In order to solve the above problems, according to a first aspect of the invention, a power tool connected to a battery pack including a battery and a battery state monitoring unit which detects overcurrent or overdischarge of the battery and outputs a detection signal, includes: a drive part driven by electric power supplied from the battery; a first switch unit for setting arbitrarily power supply from the battery to the drive part in ON/OFF state; and a second switch unit for setting the power supply to the drive part in ON/OFF state on the basis of the detection signal.

Further, according to a second aspect of the invention, the power tool includes a retaining unit which retains, in case that the first switch unit is in ON state and the power supply to the drive part is interrupted by the second switch unit, the interruption state of power supply to the drive part by the second switch unit while the first switch unit is in the ON state.

According to a third aspect of the invention, the power tool includes a first signal output unit which outputs a first signal for turning on the second switch unit, and a second signal output unit which outputs a second signal for turning off the second switch unit. Herein, in case that the battery and the drive part are connected in the state where the first switch unit is turned on, the second signal is input into the second switch unit.

According to a fourth aspect of the invention, in the power tool, the first signal output unit includes a resistor and a condenser, the second signal output unit includes at least a resistor and a condenser, and time constant by the resistor and the condenser is larger in the second signal output unit than that in the first signal output unit.

According to a fifth aspect of the invention, the power tool further includes an informative unit which informs a state of the second switch unit of a user.

According to a sixth aspect of the invention, a power tool connected to a battery pack including a battery includes a drive part driven by electric power supplied from the battery; a first switch unit for setting arbitrarily power supply from the battery to the drive part in ON/OFF state; a second switch unit for setting the power supply to the drive part in ON/OFF state on the basis of a detection signal according to a state of the battery pack; a first signal output unit which outputs a first detection signal for permitting the power supply from the battery to the drive part to the second switch unit; and a second signal output unit which outputs a second detection signal for interrupting the power supply from the battery to the drive part to the second switch unit. Herein, in case that the battery and the drive part are connected in the state where the first switch unit is turned on, the second detection signal is input to the second switch unit.

According to the power tool in the first aspect of the invention, the second switch unit which sets the power supply to the drive part in ON/OFF state on the basis of the detection signal is provided not for the battery pack but for the power tool. When the power supply to the drive part is set in ON state, the current flows into the second switch unit. However, incase of a power tool in which large current flows, plural second switch units must be provided in parallel to disperse the current. According to the power tool in the first aspect of the invention, since the second switch unit is provided for the power tool, the necessary number of second switch units may be provided correspondingly to the current which its power tool requires. Hereby, it can be prevented that: Due to a small number of the second switch units, the current amount per a second switch unit becomes excessive, so that the second switch unit breaks down. Further, since it is not necessary to provide the unnecessary number of second switch units, cost can be reduced.

Further, according to the power tool in the second aspect of the invention, there is provided the retaining unit which retains, in case that the power supply to the drive part is interrupted by the second switch unit in the state where the first switch unit is turned on, the interruption state of power supply to the drive part by the second switch unit while the first switch unit is in the ON state. Therefore, it is possible to prevent the power supply and the power interruption from being repeated in a short period. Namely, though the OFF state of the second switch unit solves the overcurrent state, and thereafter the ON state of the second switch unit restarts the power supply, the overcurrent state is soon produced again, so that the second switch unit is turned off again. The repeat of this ON/OFF of the second switch can be prevented by the retaining unit. Also, while the first switch unit is in the ON state, the interruption state is retained in case that the second switch unit is interrupted so as to present the power tool from being driven again when overcurrent is removed by taking the power tool away from the object. Accordingly, safety improvement can be made.

According to the power tool in the third aspect of the invention, there are the first signal output unit which outputs the first signal for turning on the second switch unit, and the second signal output unit which outputs the second signal for turning off the second switch unit. Herein, in case that the battery and the drive part are connected in the state where the first switch unit is turned on, the second signal is input into the second switch unit. Therefore, once the second switch unit is turned off, while the first switch unit is turned on, it is possible to prevent the electric power from being supplied again to the drive part.

According to the power tool in the fourth aspect of the invention, the first signal output unit includes the resistor and the condenser, the second signal output unit includes at least the resistor and the condenser, and time constant by the resistor and the condenser is larger in the second signal output unit than that in the first signal output unit. Therefore, once the second switch unit is turned off, while the first switch unit is turned on, it is possible to prevent the electric power from being supplied again to the drive part by simple construction.

According to the power tool in the fifth aspect of the invention, there is the informative unit which informs the state of the second switch unit of the user. Therefore, the user can recognize that the second switch unit is turned off and the power tool cannot be operated.

According to the power tool in the sixth aspect of the invention, there are provided the first signal output unit which outputs the first detection signal for permitting the power supply from the battery to the drive part to the second switch unit, and the second signal output unit which outputs the second detection signal for interrupting the power supply from the battery to the drive part to the second switch unit. Herein, in case that the battery and the drive part are connected in the state where the first switch unit is turned on, the second detection signal is input to the second switch unit. Therefore, once the second switch unit is turned off, while the first switch unit is turned on, it is possible to prevent the electric power from being supplied again to the drive part.

BRIEF DESCRIPTION OF THE DRAWINGS

In the accompanying drawings:

FIGS. 3A, 3B are diagrams explaining the operation when the battery pack has been connected to the power tool in a state where a trigger switch of the power tool in the embodiment is in ON state.

DESCRIPTION OF THE EMBODIMENTS

A power tool according to one embodiment of the invention will be described with reference to FIGS. 1 to 3.

Figure 1:
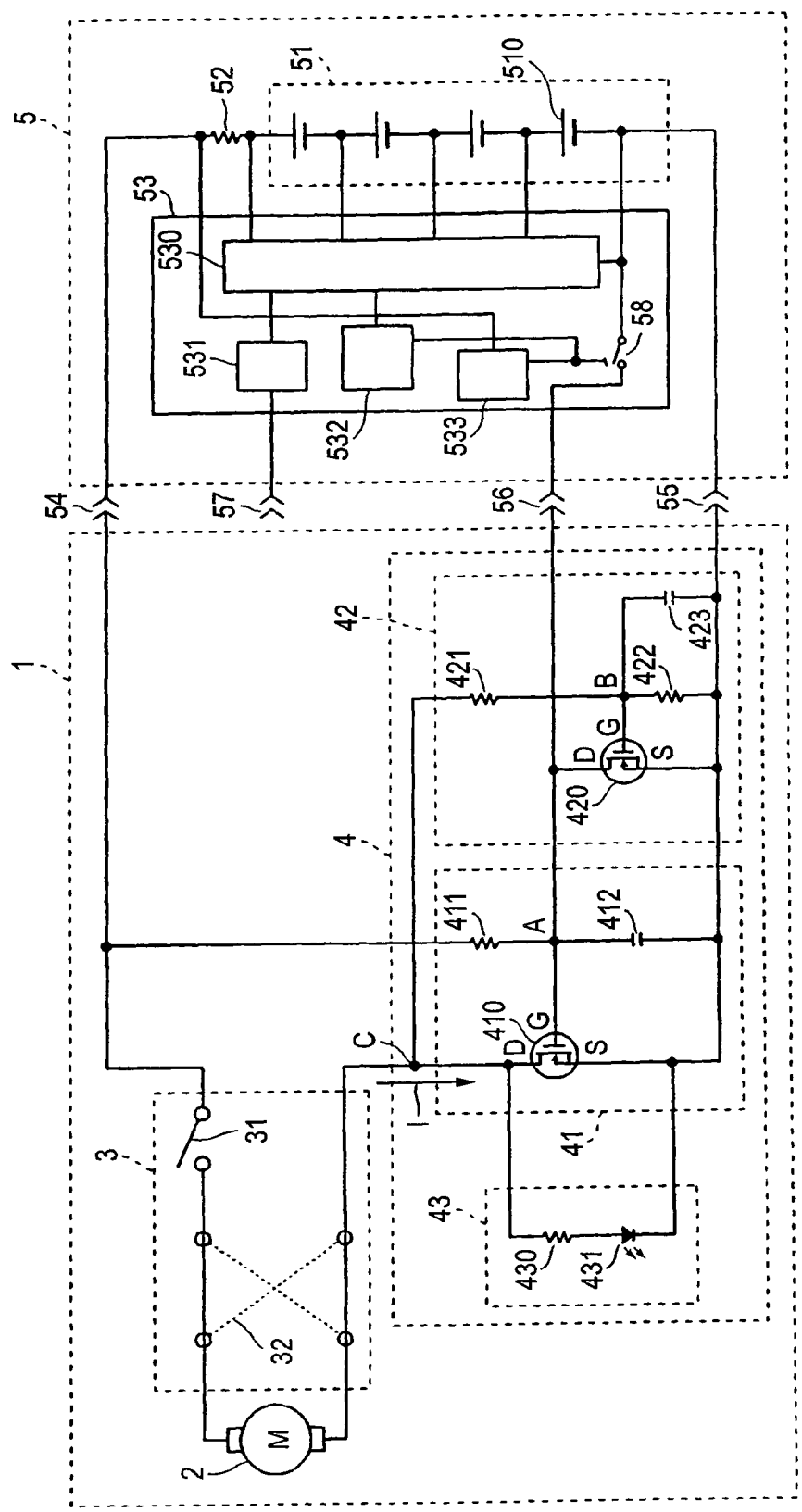
FIG. 1 is a circuit diagram showing the constitution of a power tool and a battery pack according to one embodiment of the invention.

As shown in FIG. 1, a power tool 1 in the embodiment is used in connection with a battery pack 5. The power tool 1 and the battery pack 5 are connected removably through a positive terminal 54, a negative terminal 55, and an overcurrent/overdischarge output terminal 56.

The power tool 1 includes a motor 2 driven by electric power supplied from the battery pack 5, a switch unit 3 including a trigger switch 31 which is manually switchable, and a controller 4 which controls rotation of the motor 2.

The battery pack 5 is connected to the power tool 1 in a state where the battery pack 5 has been previously charged at the predetermined voltage and more, thereby to supply the predetermined voltage between the positive terminal 54 and the negative terminal 55. When the trigger switch 31 is closed, a closed circuit through the motor 2 is formed between the positive terminal 54 and the negative terminal 55. The motor 2 receives the predetermined electric power thereby to be driven.

The battery pack 5 includes a battery module 51 in which plural battery cells 510 are connected in series, a resistor 52, for detecting a current flowing into the batter module 51, connected between the positive terminal 54 and the battery module 51, and a battery protection IC 53 which detects overdischarge, overcurrent, and overvoltage (or overcharge) of each battery cell 510, and outputs a signal according to the detection result to the power tool 1 or a charger.

The resistor 52 and the battery module 51 are connected, between the positive terminal 54 and the negative terminal 55, to each other in series. The battery cell 510 constituting the battery module 51 is a charge battery such as a lithium-ion battery. The battery protection IC 53, when it monitors the overdischarge and the overcurrent of each battery cell 510, and detects the overdischarge or the overcurrent in any battery cell 510, outputs a signal for interrupting the power supply to the motor 2 through the overcurrent/overdischarge output terminal 56 to the controller 4. Further, when the battery protection IC 53 detects that the battery cell 510 is in the overcharge state, that is, when the battery protection IC 53 judges the battery cell 510 to be in the overcharge state in case that the voltage of the battery cell 510 comes to 4.35V or higher because rating of the lithium-ion battery is 3.6V per battery cell and the maximum charging voltage is 4.2V, the battery protection IC 53 outputs a signal for stopping charging through an overcharge output terminal 57 to a charger. The "overcurrent" means a state where the current flowing into a load exceeds a predetermined value, and the "overdischarge" means a state where the residual voltage of each battery cell becomes lower than a predetermined value. In the embodiment, the current value of the overcurrent is 70 A, and the voltage value of the overdischarge of one battery cell 510 is 2V.

The battery protection IC 53 includes a battery cell voltage detector 530, an overvoltage detector 531, an overdischarge detector 532, an overcurrent detector 533, and a switch 58. The battery cell voltage detector 530 detects the voltage of each battery cell 510, and outputs a detection result to the overvoltage detector 531 and the overdischarge detector 532.

Into the overvoltage detector 531, the voltage of each battery cell 510 is inputted from the battery cell voltage detector 530. In case that the voltage of any battery cell 510 is a predetermined value or higher, the overvoltage detector 531 judges that the overvoltage is produced.

Into the overdischarge detector 532, the voltage of each battery cell 510 is inputted from the battery cell voltage detector 530. In case that the voltage of any battery cell 510 is a predetermined value or lower, the overdischarge detector 532 judges that the overdischarge is produced, and outputs a signal for closing (turning on) the switch 58.

The overcurrent detector 533 detects a value of the current flowing in the resistor 52, judges, in case that the detected current is over the predetermined value, that the overcurrent is produced, and outputs a signal for closing the switch 58.

When the switch 58 is closed by the signal from the overdischarge detector 532 or the overcurrent detector 533, the overcurrent/overdischarge output terminal 56 and a ground line are connected. Accordingly, in this case, the battery protection IC 53 outputs the voltage of zero volts ($L_O$ signal) to the controller 4 of the power tool 1.

The motor 2 of the power tool 1 is connected through the switch unit 3 and the controller 4 to the positive terminal 54 and the negative terminal 55. The switch unit 3 is connected to the motor 2, and includes a trigger switch 31 and an invert switch 32. The trigger switch 31 is connected to the motor 2 in series, and turned on/off by user's operation. The invert switch 32 is a switch for inverting the polarity of the motor 2 connected to the positive terminal 54 and the negative terminal 55 thereby to change the rotational direction of the motor 2.

The controller 4, upon reception of the signal for interrupting the power supply from the battery protection IC 53, breaks the closed circuit for power supply to the motor 2, and stops the drive. The controller 4 includes a main current switch circuit 41, a main current switch-off retaining circuit 42 and a display part 43.

The main current switch circuit 41 is composed of a field-effect transistor (FET) 410, a resistor 411, and a condenser 412. In the FET 410, a drain is connected to the motor 2, a gate is connected to the overcurrent/overdischarge output terminal 56, and a source is connected to the negative terminal 55. The resistor 411 is connected between the positive terminal 54 and the gate of the FET 410. The condenser 412 is connected between the gate and the source of FET 410. A contact among the gate of FET 410, the resistor 411 and the condenser 412 is taken as a contact A.

FET 410, while the power is normally supplied from the battery pack 5 to the motor 2, is in ON-state. Namely, when the power tool 1 and the battery pack 5 are connected, the battery voltage is applied through the resistor 411 to the contact A (gate of the FET 410), so that the FET enters the ON state. On the other hand, when the battery protection IC 53 detects the overdischarge or the overcurrent, and the voltage of 0 V ($L_O$ signal) is inputted from the overcurrent/overdischarge output terminal 56 to the gate of the FET 410, the FET 410 enters OFF state and breaks the power supply to the motor 2.

The main current switch-off retaining circuit 42 is composed of an FET 420, a resistor 421, a resistor 422, and a condenser 423. In the FET 420, a drain is connected to a gate of the FET 410 and the overcurrent/overdischarge output terminal 56, and a source is connected to the negative terminal 55. Further, a gate is connected through the resistor 421 to the motor 2 and the drain of the FET 410, and connected through the resistor 422 and the condenser 433 which are connected to each other in parallel to the negative terminal 55. When the voltage is produced in a contact B on the gate side of the FET 420, the FET 420 is turned on, and the contact A connected to the drain of the FET 420 is connected to the negative terminal 55 (ground line). Since the contact A is connected to the gate of the FET 410, the gate of the FET 410 is also connected to the negative terminal 55, so that the FET 410 is turned off.

The display part 43 is composed of a resistor 430 and a display (LED in the embodiment) 431, and is connected between the drain and the source of the FET 410 in parallel. In case that the trigger switch 31 is in the OFF state, or in case that the FET 410 is turned on, the trigger switch 31 is turned on, and the power is supplied to the motor 2, since a potential difference does not exist between both ends of the display part 43, the display 431 does not light up. On the other hand, in case that the overdischarge or the overcurrent is detected and the FET 410 enters the OFF state, the potential difference is produced between the drain and the source. Namely, since the current flows through the resistor 430, the display 431 lights up and displays that the overdischarge or the overcurrent is being detected. Hereby, the user can recognize that the power tool 1 cannot be operated due to the overdischarge or the overcurrent.

The operations of thus constructed power tool 1 and battery pack 5 will be described. Referring first to FIGS. 1 and 2, the operation in case that the trigger switch 31 has been turned on in a state where the power tool 1 and the battery pack 5 are connected will be described.

Figure 2A:
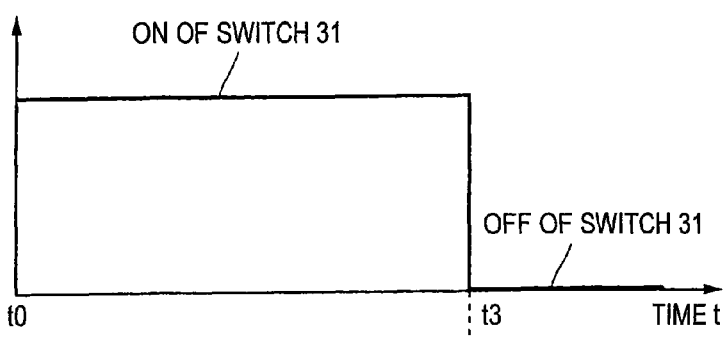
FIGS. 2A, 2B, 2C are diagrams explaining the operation when overcurrent or overdischarge has been detected in the power tool and the battery pack in the embodiment.
Figure 2B:
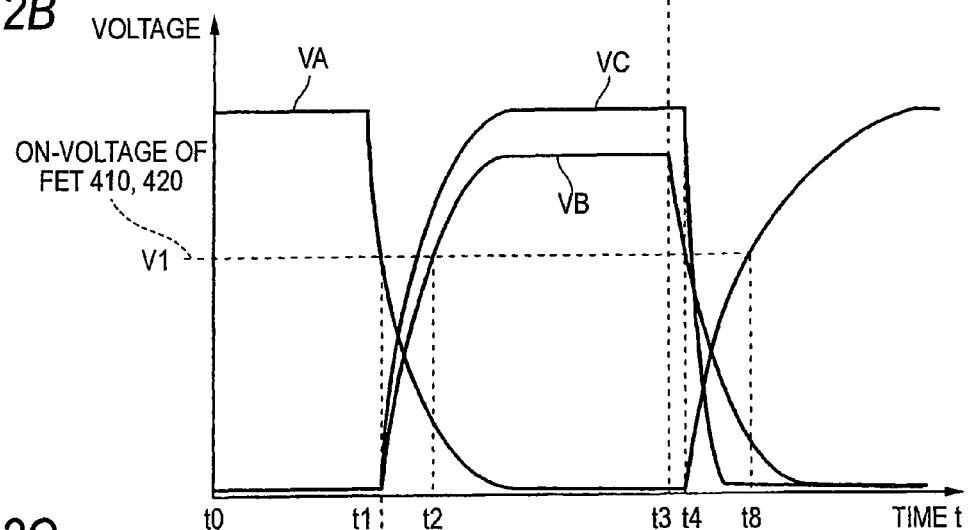
Figure 2C:
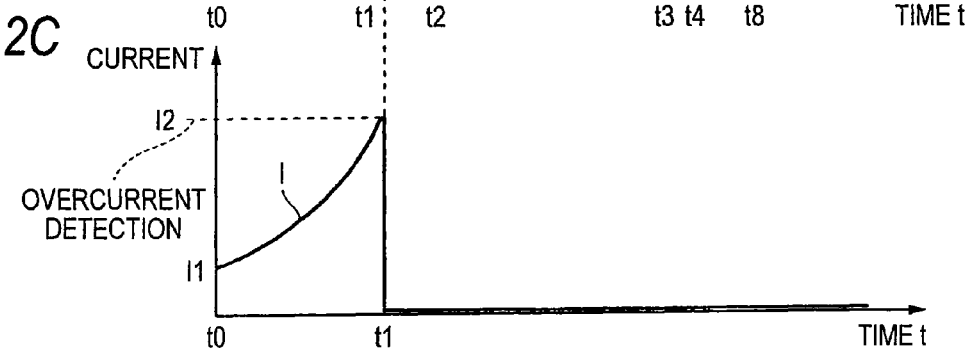

FIG. 2(a) is a diagram showing ON/OFF timing of the trigger switch 31. FIG. 2(b) is a time chart of a voltage VA, a voltage VB, and a voltage VC at a contact A, a contact B, and a contact C in FIG. 1, in which a vertical axis indicates the voltage VA, the voltage VB, and the voltage VC, and a horizontal axis indicates time. FIG. 2(c) is a time chart of current detected by the overcurrent detector 533 of the battery pack 5, in which a vertical axis indicates current I, and a horizontal axis indicates time.

Time t0 is taken as arbitrary time when the electric power is normally supplied from the battery pack 5 to the motor 2 after the trigger switch 31 has been turned on. Here, the trigger switch 31 is in the ON state from the time t0 to the time t3, and is turned off at the time t3. Further, as shown in FIG. 2(c), though the current I is I1 at the time t0, it increases with the lapse of the time (overcurrent value I2 at the time t1).

When the overcurrent detector 533 of the battery pack 5 detects that the current flowing in the resistor 52 has come to I2 that is the overcurrent value at the time t1, it turns on the switch 58. By ON of the switch 58, the voltage of 0 volt ($L_O$ signal) is outputted from the overcurrent/overdischarge output terminal 56, and inputted into the gate of the FET 410. Hereby, as shown in 2(b), the voltage VA kept at a constant value lowers from the time t1; and when the voltage VA becomes lower than ON-voltage V1, the FET 410 is turned off. Hereby, the power supply to the motor 2 is broken.

When the FET 410 is in the OFF state, the current path changes to a path through the resistor 421, the resistor 422, and the condenser 423, that is, a path through the main current switch-off retaining circuit 42, with the result that the voltage VC at the contact C increases. Simultaneously, the voltage VB also increases, and the FET 420 is turned on at the time t2 that is over the ON-voltage V1. Then, the contact A, that is, the gate of the FET 410 is connected to the negative terminal 55.

In case that the main current switch-off retaining circuit 42 is not provided, OFF of the FET 410 solves the overcurrent state, and thereafter, the FET 410 is turned on again to start the power supply. However, in this case, the overcurrent state is soon produced again, and the FET 410 is turned off again. Namely, ON and OFF of the FET 410 are repeated. However, in the embodiment, the main current switch-off retaining circuit 42 is provided. Therefore, even in case that the overcurrent is solved and the switch 58 is turned off, since the FET 420 of the main current switch-off retaining circuit 42 is in the ON-state, the voltage of 0 V is kept supplied to the gate of the FET 410, so that the FET 410 retains the OFF-state. Accordingly, the interruption of the power supply to the motor 2 is kept.

When the trigger switch 31 is turned off at the time t3, the voltage VB lowers and thereafter becomes lower than the ON-voltage V1 at the time t4, so that the FET 420 is turned off. After the FET 420 has been turned off once, the battery voltage is applied through the resistor 411 to the gate of the FET 410 again. Namely, the voltage VA rises smoothly, and thereafter the FET 410 is turned on at the time t8 when the voltage VA exceeds the ON-voltage V1. When the trigger switch 31 is turned off under this state, the power supply to the motor 2 is allowed. Also in case of the overdischarge, the similar operation is carried out.

As described above, according to the power tool 1 in the embodiment, The FET 410 which sets the power supply to the motor 2 in ON/OFF state is provided not for the battery pack 5 but for the power tool 1. When the power supply to the motor 2 is in the ON state, the current flows into the FET 410. In case of a power tool in which large current flows, plural FET's 410 must be provided in parallel to disperse the current, or a battery pack having large rating capacity must be selected in response to the usable power tool. However, according to the power tool 1 in the embodiment, since the FET 410 is provided for the power tool 1, in response to the current which the power tool 1 requires, the use of the FET 410 may be selected or the necessary number of FET's 410 may be provided. Hereby, it can be prevented that: due to a small number of the FET's, the current amount per FET 410 becomes excessive, so that the FET 410 breaks down. Further, since it is not necessary to provide the unnecessary number of FET's, and further, since the FET in response to the power tool 1 can be selected, cost can be reduced.

Further, there is provided the main current switch-off retaining unit 42 which retains, in case that the power supply to the motor 2 is interrupted by the FET 410 in the state where the trigger switch 31 is turned on, the interruption state of power supply to the motor 2 by FET 410 while the trigger switch 31 is turned on. Therefore, it is possible to prevent the power supply and the power interruption from being repeated in a short period. Namely, though OFF of the FET 410 solves the overcurrent state, and thereafter ON of the FET 410 restarts the power supply, the overcurrent state is soon produced again, so that the FET 410 is turned off again. The repeat of this ON/OFF of the FET 410 can be prevented. Also in case of the overdischarge, the similar operation is carried out.

Next, with reference to FIGS. 1 and 3, the operation in case that the power tool 1 is connected to the battery pack 5 charged at a given voltage in the state where the trigger switch 31 is in ON state will be described.

FIG. 3(a) is a diagram showing ON/OFF timing of the trigger switch 31. FIG. 3(b) is a time chart of voltage VA and voltage VB at a contact A and a contact B, in which a vertical axis indicates the voltage VA and the voltage VB, and a horizontal axis indicates time.

At the time t0, the battery pack 5 is connected to the power tool 1 in the state where the trigger switch 31 is turned on. Herein, till the time t6, the trigger switch 31 is in the ON state; and at the time t6, the trigger switch 31 is turned off. As shown in FIG. 3(b), as soon as the battery pack 5 is connected to the power tool 1, both the voltage VA and the voltage VB increase.

In the embodiment, time constant of the circuit composed of the resistor 411 and the condenser 412, and time constant of the circuit composed of the resistor 421 and the condenser 423 are set so that the voltage VB rises earlier than the voltage VA. In the embodiment, the resistor 411, the condenser 412, the resistor 421, and the condenser 423 have a resistance value 1 MΩ, a capacitance 1 µF, a resistance value 1KΩ, and a capacitance 1 µF respectively. Accordingly, the voltage VB rises earlier than the voltage VA, and exceeds the ON-voltage V1 at the time t5, and the FET 420 is turned on. When the FET 420 is turned on, the voltage VA at the contact A becomes 0 volt. Therefore, the voltage of 0 V (Lo signal) is input into the gate of the FET 410, and the FET 410 is not turned on. The OFF-state of the FET 410 is retained till the trigger switch 31 is turned off.

When the trigger switch 31 is turned off at the time t6, since the charge of the condenser 423 is discharged by the resistor 422, the voltage VB lowers. When the voltage VB becomes lower than the ON-voltage V1, the FET 420 is turned off. By OFF of the FET 420, a closed circuit leading to the negative terminal 55 through the positive terminal 54, the resistor 411, and the condenser 412 is formed in the power tool 1, and the voltage VA increases.

Thus, according to the power tool 1 in the embodiment, in case that the power tool 1 is connected to the battery pack 5 in the state where the trigger switch 31 is in the ON state, it is possible to prevent that the electric power is supplied to the motor 2 and the operation starts, whereby improvement of safety can be realized. In order to obtain such the effect, the overcurrent detector 533 and the overdischarge detector 532 are not required, and the switch 58 for informing the overcurrent or the overdischarge of the controller 4 is also not required.

In the embodiment, the motor 2 is a drive part of the invention, the trigger switch 31 is a first switch unit of the invention, the FET 410 is an interruption unit of the invention, the main current switch-off retaining circuit 42 is a retaining unit of the invention, the display part 43 is an informative unit of the invention, the battery protection IC 53 is a battery state monitoring unit of the invention, the resistor 411 and the condenser 412 constitute a first signal output unit of the invention, and the FET 420, the resistor 421, and the condenser 423 constitute a second signal output unit of the invention.

The power tool 1 according to the invention is not limited to the above embodiment, but various modifications and improvements are possible within the scope of the accompanying claims.

What is claimed is:

1. A power tool comprising:
    a battery pack including at least one lithium-ion cell;
    a motor driven by electric power supplied from the battery pack;
    a current path connecting the motor and the lithium-cell, said current path including a first switch and a first FET;

a battery protection IC electrically connected to the current path, the battery protection IC outputting a first detection signal when the battery protection IC detects that the current in the current path exceeds a predetermined current value and a second detection signal when the battery protection IC detects that a voltage of the lithium-ion cell is lower than a predetermined voltage value;

said first switch being switchable between an ON state and OFF state depending on user operation;

said first FET being switchable from its ON state to its OFF state responsive to the first detection signal or the second detection signal, whereby the current flows in the current path, when the first switch and the first FET are both in their respective ON states; and a second FET positioned outside of the current path, said second FET being connected to said first FET via a circuit, said second FET being operable, in response to an overcurrent or low voltage, to change its switching state, wherein when the current in the current path becomes lower than the predetermined current value, the first FET maintains its OFF state when the first switch is in its ON state after the first FET changes to its OFF state, and wherein when the voltage of the lithium-ion cell becomes higher than the predetermined voltage, the first FET maintains its OFF state when the first switch is in its ON state after the first FET changes to its OFF state.

2. The power tool according to claim 1, wherein the battery pack comprises a plurality of lithium-ion cells.

3. The power tool according to claim 2, wherein the battery protection IC comprises a plurality of terminals, each of said terminals being connected to one of the plurality of lithium-ion cells, whereby the voltage of each of the plurality of lithium-ion cells may be monitored.

4. The power tool according to claim 3, wherein the battery protection IC outputs the second detection signal when the voltage of one of the plurality of lithium-ion cells becomes lower than a predetermined voltage value.

5. The power tool according to claim 1, the battery pack further including:

a detection signal terminal for outputting the first detection signal and the second detection signal.

* * * * *